US009544147B2

(12) United States Patent
Rouskov et al.

(10) Patent No.: US 9,544,147 B2
(45) Date of Patent: Jan. 10, 2017

(54) MODEL BASED MULTI-TIER AUTHENTICATION

(75) Inventors: Yordan I. Rouskov, Kirkland, WA (US); Wei-Qiang Michael Guo, Bellevue, WA (US); Orville Charles McDonald, Seattle, WA (US); Ramu Movva, Redmond, WA (US); Kyle Stapley Young, Duvall, WA (US); Kok Wai Chan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 602 days.

(21) Appl. No.: 12/470,656

(22) Filed: May 22, 2009

(65) Prior Publication Data
US 2010/0299716 A1    Nov. 25, 2010

(51) Int. Cl.
G06F 21/00      (2013.01)
H04L 9/32       (2006.01)
G06F 21/42      (2013.01)
H04W 12/06      (2009.01)

(52) U.S. Cl.
CPC ............. H04L 9/3234 (2013.01); G06F 21/42 (2013.01); H04L 9/3228 (2013.01); H04L 9/3271 (2013.01); H04L 2209/80 (2013.01); H04W 12/06 (2013.01)

(58) Field of Classification Search
CPC ...... H04L 63/205; H04L 63/20; H04L 9/3234; H04L 9/3228; H04L 9/3271; H04L 2209/80; G06F 21/31; G06F 21/42; H04W 12/06
USPC .................................................... 726/1, 2, 5
See application file for complete search history.

(56) References Cited

U.S. PATENT DOCUMENTS

| | | | |
|---|---|---|---|
| 7,194,628 B1* | 3/2007 | Guthery ........................ | 713/168 |
| 7,444,368 B1* | 10/2008 | Wong et al. .................. | 709/200 |
| 7,640,574 B1* | 12/2009 | Kim et al. ......................... | 726/1 |
| 2002/0138726 A1 | 9/2002 | Sames et al. | |
| 2003/0018786 A1* | 1/2003 | Lortz ............................. | 709/226 |
| 2004/0123151 A1* | 6/2004 | Mizrah ......................... | 713/201 |
| 2005/0149759 A1 | 7/2005 | Vishwanath et al. | |
| 2006/0021003 A1 | 1/2006 | Fisher et al. | |
| 2006/0156385 A1 | 7/2006 | Chiviendacz et al. | |
| 2008/0031235 A1 | 2/2008 | Harris et al. | |
| 2008/0034207 A1* | 2/2008 | Cam-Winget et al. ....... | 713/163 |
| 2008/0103985 A1* | 5/2008 | Huang et al. .................. | 705/76 |
| 2008/0134286 A1* | 6/2008 | Amdur et al. ..................... | 726/1 |
| 2008/0141339 A1* | 6/2008 | Gomez et al. ..................... | 726/1 |
| 2008/0155658 A1* | 6/2008 | Leinonen et al. ................ | 726/4 |
| 2008/0209213 A1* | 8/2008 | Astrand et al. ............... | 713/168 |
| 2009/0133117 A1* | 5/2009 | Bentley et al. ................. | 726/17 |
| 2009/0165103 A1* | 6/2009 | Cho et al. ......................... | 726/6 |
| 2009/0327131 A1* | 12/2009 | Beenau et al. .................. | 705/44 |

FOREIGN PATENT DOCUMENTS

| | | |
|---|---|---|
| CN | 1673925 A | 9/2005 |
| CN | 101197026 A | 6/2008 |
| CN | 101375547 A | 2/2009 |
| KR | 1020030055717 A | 4/2003 |
| WO | 2004098144 A1 | 11/2004 |

OTHER PUBLICATIONS

Lockhart et al., "GeoTrust Two-factor Authentication Solutions Gaining Momentum by Organizations Large and Small to Provide Stronger Online Security", Jun. 7. 2006—GeoTrust, Inc., http://www.quickssl.com/about/news_events/press/PR_2factor_060706s.pdf.
"Authenticating Users to the Database", 2000, 2003 Oracle Corporation, pp. 1-8, http://www.stanford.edu/dept/itss/docs/oracle/10g/network.101/b10777/authuser.htm.
"Stadrin: Strong User authentication and Access Control for LINUX Environments in a Fully Integrated System using PAM modules", http://www.vasco.com/documents/partners/pdf/Stadrin_leaflet.pdf?VSID=a17e5d341373538005d326dbe5720dca.
"Entrust Identity Guard: Open Versatile Authentication Platform for Consumers". http://www.entrust.com/strong-authentication/consumer-security/.
"Managing Strong Authentication: A Guide to Creating an Effective Management System", 2007, http://ca.com/files/TechnologyBriefs/managing_stron_authen_wp.pdf.
International Search Report in related PCT Application No. PCT/US2010/035210 dated Nov. 30, 2010.
Int. Preliminary Report cited in PCT Application No. PCT/US2010/035210 dated Nov. 22, 2011, 6 pgs.
Chinese Search Report cited in Chinese Application No. 201080022432.2 dated Jan. 6, 2014, 2 pgs.
Reply first Chinese Office Action cited in Chinese Application No. 201080022432.2 dated Apr. 15, 2014, 3 pgs.
Australian Office action application No. 2010249698 dated Jul. 21, 2014, 3 pages.

(Continued)

Primary Examiner — Kendall Dolly
(74) Attorney, Agent, or Firm — Bryan Webster; Raghu Chinagudabha; Micky Minhas

(57) ABSTRACT

Authentication is widely used to protect consumer data and computing services, such as email, document storage, and online banking. Current authentication models, such as those employed by online identity providers, may have limited options and configurations for authentication schemes. Accordingly, as provided herein, a model based authentication scheme may be configured based upon a policy and/or an authentication mechanism list. The policy may define the target resource, a user, a group the user belongs to, devices used to connect to the target resource, a service owning the target resource, etc. The authentication mechanism list may comprise predefined authentication mechanisms and/or user plug-in authentication mechanisms (e.g., user created authentication mechanism). Once the authentication scheme is configured, it may be enforced upon authentication requests from a user. Feedback may be provided to the user based upon patterns of usage of the target resource.

19 Claims, 9 Drawing Sheets

(56) References Cited

OTHER PUBLICATIONS

Response to Australian Office action, dated Sep. 9, 2014, 16 pages.
Third Chinese Office Action cited in Chinese Application No. 201080022432.2 dated Mar. 25, 2015, 5 pgs.
Reply/Claims third Chinese Office Action cited in Chinese Application No. 201080022432.2 dated Aug. 10, 2015, 2 pgs.
"Fourth Office Action and Search Report Received for Chinese Patent Application No. 201080022432.2", Mailed Date: Sep. 6, 2015, 14 Pages.
Second Chinese Office Action and Search Report cited in Chinese Application No. 201080022432.2, dated Aug. 22, 2014, 5 pgs.
Reply Second Chinese Office Action cited in Chinese Application No. 201080022432.2, dated Nov. 5, 2014, 2 pgs.
Australian Notice of Allowance cited in Australian Application No. 2010249698 dated Oct. 15, 2014, 2 pgs.

\* cited by examiner

MODEL BASED MULTI-TIER AUTHENTICATION

BACKGROUND

Many computing services (e.g., email, document storage, social networking, online banking, company network access, blogging services, etc.) utilize authentication mechanisms for security. Online identity providers may provide authentication schemes consumed by computing services and users with diverse security needs. Unfortunately, users may not have the ability to configure the type of authentication mechanisms within an authentication scheme that is used to access these computing resources. For example, a social networking service may provide users with an authentication scheme comprising a username and password along with a challenge-response question. If, for example, an online identity provider has a set authentication scheme for the social networking service, then a user may not have the ability to customize the authentication scheme, such as adding and/or removing the authentication mechanisms (e.g., adding a device ID) used within the authentication scheme, which may provide a less satisfactory user experience, which may be exacerbated based upon the type of provider. That is, substantial disparity may exist between different types of providers regarding how authentication is accomplished. For example, a large scale online identification service provider may provide identity services that are consumed by services and consumers with diverse security needs, whereas a bank, for example, may have relatively fixed security requirements and a more homogeneous user base. Accordingly, a relatively static, inflexible authentication scheme may prove less than satisfactory given the diversity of authentication needs and/or applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, an online identity provider may, for example, be able to offer a variety of authentication mechanisms through a configurable authentication scheme in a consumer friendly way to a large and diverse consumer base (e.g., individual user, a group of users, a large corporation, a computer service provider, etc.), thus affording flexibility to different online identity provides who have different needs. Accordingly, among other things, a technique for configuring a model based authentication scheme is disclosed. A policy and/or an authentication mechanism list comprising at least one authentication mechanism to associate with an authentication scheme may be received. An authentication mechanism, for example, may comprise one or more predefined authentication mechanisms (e.g., authentication mechanisms already available from an online identity provider) and/or one or more user plug-in authentication mechanism (e.g., authentication mechanism created and registered by a user that may not be already available from an online identity provider). It may be appreciated that an authentication mechanism may be interpreted as, for example, an authentication technique (e.g., a username and password authentication, a device ID authentication, etc.) that may be represented as a private/public key pair. In another example, the actual technique for authentication (e.g., source code) may reside remotely (e.g., on a remote user's desktop), whereby the authentication mechanism provides a way to access and execute the actual technique.

The policy, for example may comprise a user policy (e.g., authentication for accessing user resources), a group policy (e.g., authentication for accessing group resources), a mode of connection policy (e.g., authentication based upon the type of device used for authenticating), a service policy (e.g., authentication for users accessing a service's resources), etc. It may be appreciated that a policy may be interpreted, for example, as an authentication configuration defining how the one or more authentication mechanisms may be enforced (e.g., whom may be authenticated, which authentication mechanisms may be used, what resources may be accessed, etc.). The authentication scheme may be configured according to the policy and/or the authentication mechanism list.

The authentication scheme may be enforced upon receiving an authentication request from a user. For example, one or more authentication mechanisms defined within the authentication scheme may be executed upon the authentication request to authenticate the user based upon the policy configured within the authentication scheme. It may be appreciated that the authentication scheme may be configured such that an alternative authentication mechanism may be executed upon failure of an authentication mechanism (e.g., if the user does not have a device ID, then the user may alternatively authenticate using a one time password).

It may be appreciated that an authentication scheme may be interpreted, for example, as a security configuration (e.g., defining whom is to be authenticated, how they are authenticated, and what resources may be access as specified by a policy), which may be utilized by an online service provider to provide a configurable security solution to particular computing services and/or users. For example, a social networking web service may configure an authentication scheme that defines how users of the social networking web service may be authenticated through an online identity provider. The online identity provider may authenticate users by enforcing the authentication scheme. That is, when a user attempts to authenticate through the online identity provider, one or more authentication mechanisms configured within the authentication scheme may be executed based upon a policy configured by the social networking website.

A user access model may be created based upon enforcement of the authentication scheme. For example, the user access model may be created and/or updated based upon patterns of usage (e.g., how often a user accesses a resource, activities performed through the resource, etc.) The user access model may be compared with a recommended usage (e.g., typical security for a particular resource) to present a suggested authentication. In one example, it may be determined that a user may have a low security authentication scheme for frequently accessed banking data in comparison to typical security for frequently accessed banking data. The user may be presented with a suggested authentication scheme comprising a high security authentication scheme. In another example, the user may have a high security authentication scheme for personal email, wherein a recommended security may be a low security authentication scheme.

It may be appreciated that a user access model may be defined by, for example, a collection of services associated with a user and their respective usage patterns. For example, a user access model may be labeled as a high identity tier because the corresponding user actively uses email and instant messaging services as compare to a low identity tier without communication services provisioned or exhibiting a low usage of these services. It may be advantageous for a user corresponding to a high identity tier to secure these high identities with strong authentication policies within the authentication scheme.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
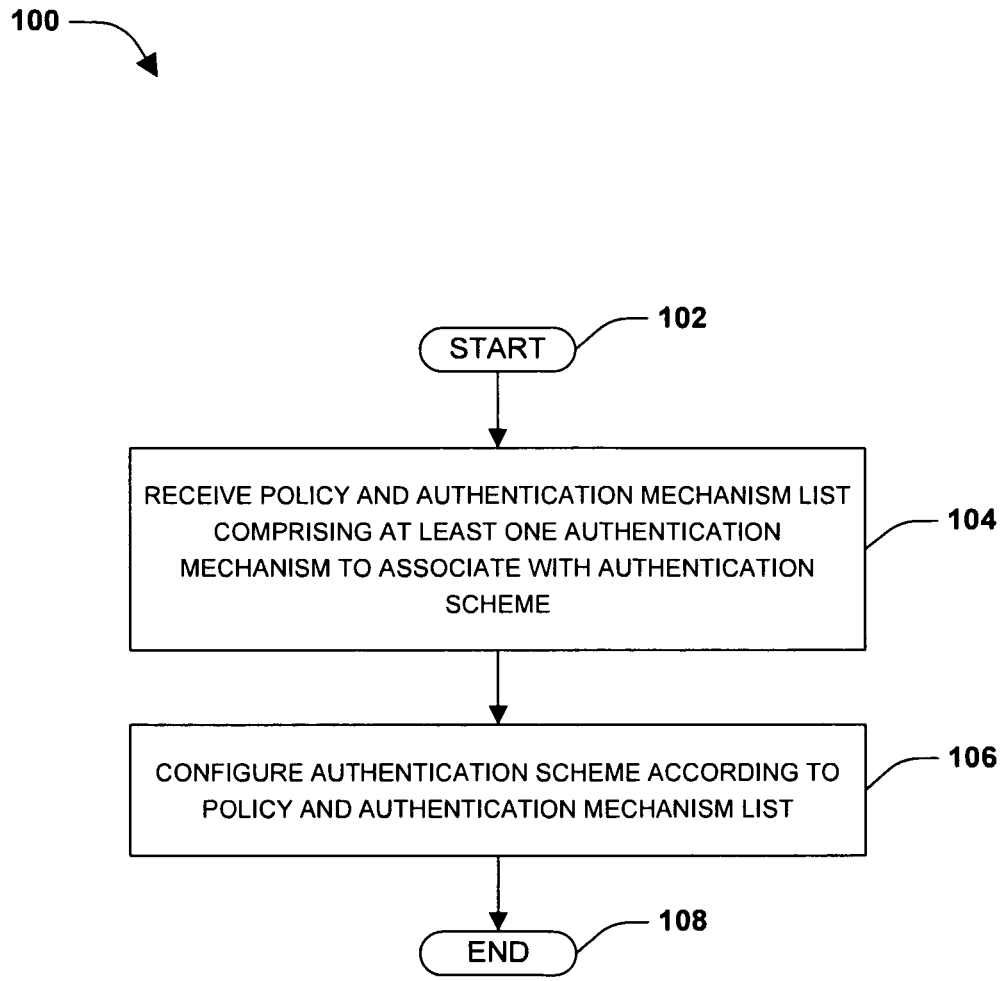
FIG. 1 is a flow chart illustrating an exemplary method of configuring a model based authentication scheme.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Currently, many computing services (e.g., document storage, email, work files, etc.) are provided with set authentication schemes with little available configuration (e.g., predefined authentication mechanisms) by online identity providers. In one example, an online banking website may use an online identity provider that provides users with a username and password mechanism for authentication. Unfortunately, users and the online banking website may be unable to configure the set authentication scheme (e.g., the user may not be able to change the authentication mechanism from the username and password to a smart card). It may be advantageous for online identity providers to provide a flexible authentication scheme, where users and/or computing services may define the security mechanism through an open model approach. In this way, particular clients (e.g., small business, personal users, large corporations, etc.) may customize their own authentication scheme for accessing resources.

Among other things, a technique for configuring a model based authentication scheme is provided herein. The authentication scheme may be based upon predefined authentication mechanisms and/or user plug-in authentication mechanisms. That is, the user may configure the authentication scheme with user plug-in authentication mechanisms that may not already be available as predefined authentication mechanisms, thus expanding a list of available authentication mechanisms.

The authentication scheme may also be configured based upon a policy. The policy allows further configuration of the authentication scheme based upon particular criteria. For example, a particular criteria may take into account the type of device used to access particular resources (e.g., a work computer as compared to a public computer), what resources are being accessed (e.g., email compared to sensitive work files), what group a user may belong to (e.g., group resources), and/or the type of user being authenticated (e.g., a sales person being authenticated remotely compared to an employee logging in through a work computer). Once configured, the authentication scheme may be enforced upon authentication requests.

Enforcement of the authentication scheme and/or patterns of resource usage may be utilized to model the user's access. The user's access may be compared with recommended usage to provide feedback to the user. For example, a suggestion to raise or lower the security of the authentication scheme may be provided to a user (e.g. the user's security is lower than the recommended security based upon the high frequency of usage).

One embodiment of configuring a model based authentication scheme is illustrated by an exemplary method 100 in FIG. 1. At 102, the method begins. At 104, a policy and/or an authentication mechanism list comprising at least one authentication mechanism to associate with an authentication scheme may be received. The at least one authentication mechanism may comprise one or more predefined authentication mechanisms and/or one or more user plug-in authentication mechanisms.

The authentication scheme may correspond to a multi-tiered authentication model. The authentication mechanism list may comprise multiple authentication mechanisms associated with multiple security tiers. For example, the authentication mechanism list may comprise a first authentication mechanism corresponding to a first security tier (e.g., a username and password) and a second authentication mechanism corresponding to a second security tier (e.g., device ID, smart card, one time password, challenge-response, IP spoofing authentication, etc.). It may be appreciated that one or more authentication mechanisms may be associated with a security tier and that one or more security tiers may be configured within the authentication scheme.

The policy may comprise a user policy defining access to user resources, a group policy defining access to group resources, a mode of connection policy defining access to resources based upon a mode (e.g., cell phone, work computer, public computer, etc.) used for connecting to the resources, and/or a service policy defining access to resources of a service (e.g., a bank defining authentication for employees and bank clients).

In one example, the policy and/or authentication mechanism list may be received through an interface (e.g., an online service) within which a user may be engaged. The user may be initially presented with one or more predefined authentication mechanisms. The user may expand the available authentication mechanisms by registering one or more user plug-in authentication mechanisms (e.g., a particular biological authentication mechanism created by the user, an authentication mechanism installed on the client's machine, etc.). When the authentication scheme is enforced, the user plug-in authentication mechanism may be called, for example, on the client machine for authentication. This allows a user to provide their own authentication mechanism that may be incorporated into the authentication scheme.

At 106, the authentication scheme may be configured according to the policy and/or the authentication mechanism list. In one example, the authentication scheme may be configured with a user policy defining a particular user plug-in authentication mechanism to be enforced upon authentication requests to access the user's personal resources (e.g., personal email, home computer files, etc.). In another example, a service (e.g., a bank) may define a service policy defining authentication mechanisms for employees (e.g., device ID and/or smart card) and authentication mechanisms for bank clients (e.g., username and password and/or challenge-response). In yet another example, a business may define a mode of connection policy, wherein a device ID is used for authentication of employees at work computers and a one time password is used for authentication of employees at public computers.

The authentication scheme may be enforced upon authentication requests from a user. That is, one or more authentication mechanisms (e.g., a first authentication mechanism, a second authentication mechanism, a third authentication mechanism, etc.) defined within the authentication scheme may be executed upon the authentication request. It may be appreciated that alternative authentication mechanisms may be specified. For example, a second security tier within the authentication scheme may allow a user to authenticate through one or more different authentication mechanisms.

A user access model may be created based upon the enforcement of the authentication scheme. For example, the user access model may comprise information relating to the type of resource, the frequency of access, the type of authentication used, and/or other information relating to the enforcement of the authentication scheme. The user access model may be updated based upon patterns of resource usage. The user access model may be compared with a recommended usage to present a user with a suggested authentication scheme. For example, the suggested authentication scheme may indicate that the user has a lower than ordinary authentication scheme. At 108, the method ends.

Figure 2:
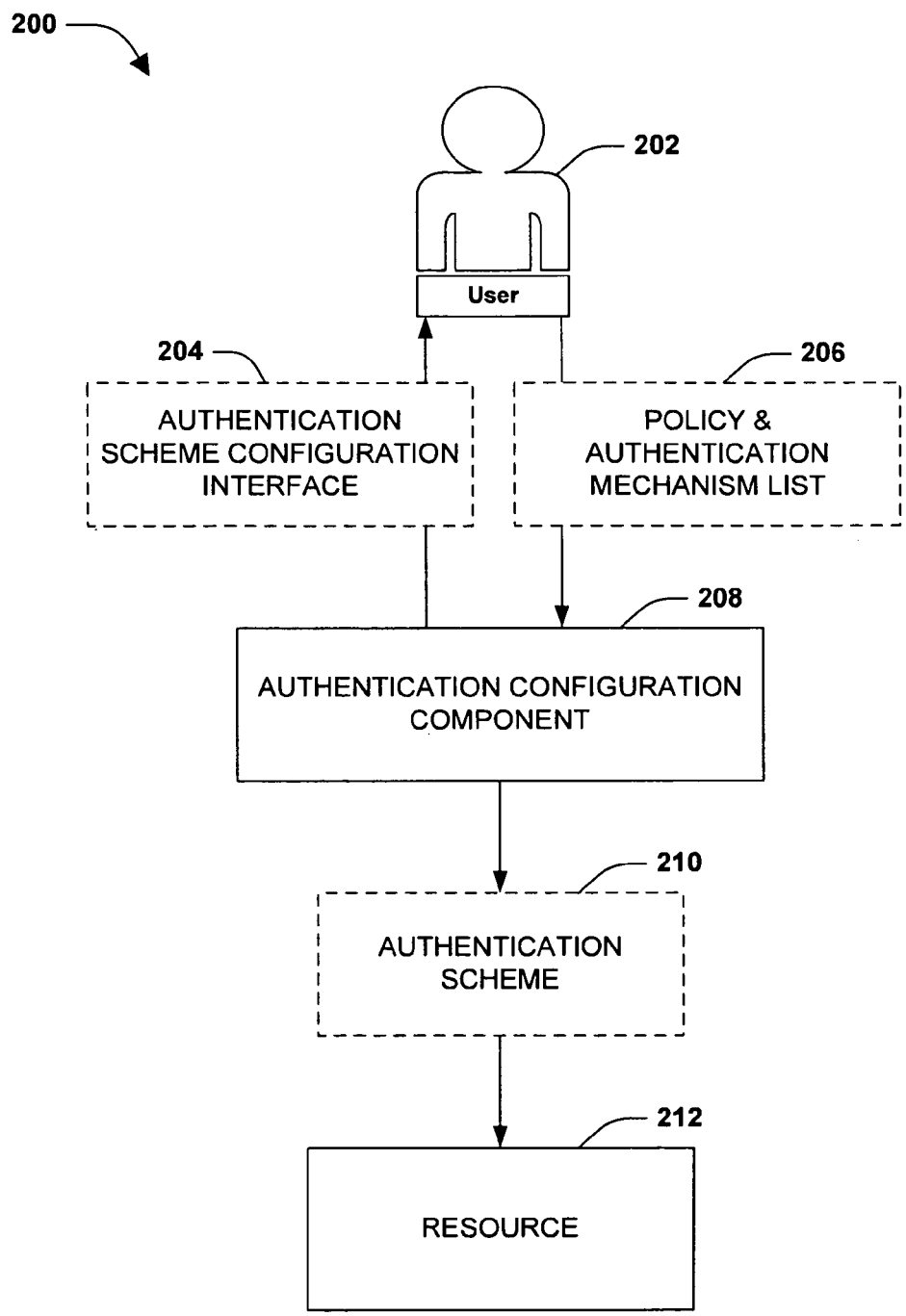
FIG. 2 is a component block diagram illustrating an exemplary system for configuring a model based authentication scheme.

FIG. 2 illustrates an example 200 of a system configured for configuring a model based authentication scheme. The system may comprise an authentication configuration component 208. The authentication configuration component 208 may be configured to present an authentication scheme configuration interface 204 comprising a set of available authentication mechanisms and/or one or more configurable policies to a user 202. The authentication configuration interface 204 may allow the user 202 to register one or more user plug-in authentication mechanisms.

The authentication configuration interface 204 may allow the user 202 to create a policy and authentication mechanism list 206. The policy and authentication mechanism list 206 may comprise a policy (e.g., a user policy, a group policy, a mode of connection policy, a service policy, etc.) and/or an authentication mechanism list. The authentication mechanism list may comprise predefined authentication mechanisms and/or user plug-in authentication mechanisms to associate with an authentication scheme 210. For example, the authentication mechanism list may comprise device ID, smart card, one time password, challenge-response, IP spoofing, biological authentication, etc. It may be appreciated that one or more of the authentication mechanisms may be associated with one or more security tiers (e.g., tiers within a multi-tier authentication model).

The authentication configuration component 208 may be configured to receive the policy and authentication mechanism list 206, with which the authentication configuration component 208 may configure the authentication scheme 210. The authentication scheme 210 may be enforced upon authentication requests from the user 202 for accessing resources (e.g., a resource 212) that the authentication scheme 210 is associated with.

Figure 3:
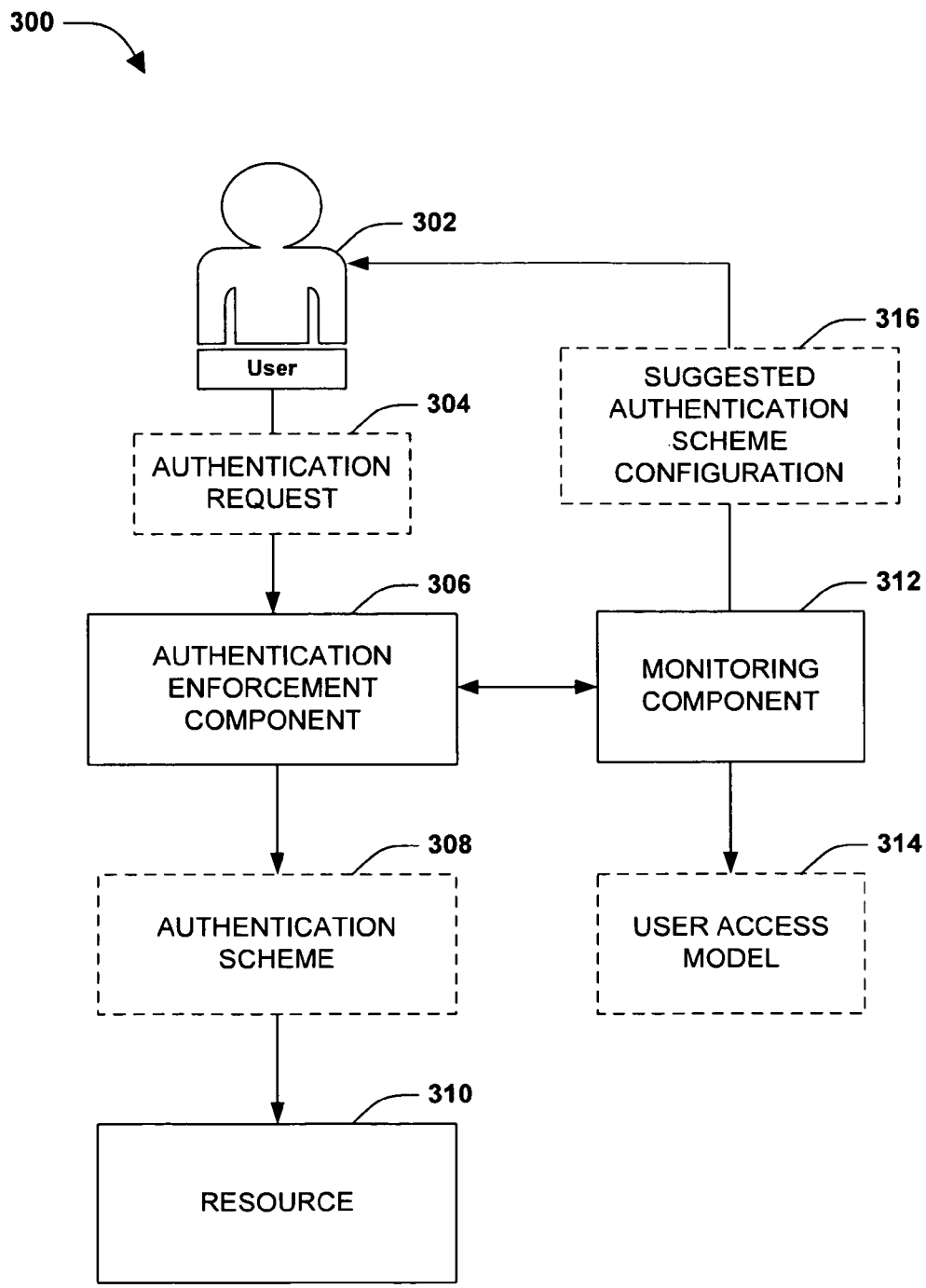
FIG. 3 is a component block diagram illustrating an exemplary system for enforcing a model based authentication scheme.

FIG. 3 illustrates an example 300 of a system configured for enforcing a model based authentication scheme. The system may comprise an authentication component 306 and/or a monitoring component 312. The authentication component 306 may be configured to receive an authentication request 304 from a user 302. The authentication request 304, for example, may be used to authenticate the user 302 for access to a resource 310. The authentication enforcement component 306 may be configured to enforce an authentication scheme 308 upon the authentication request 304. For example, the authentication enforcement component 306 may execute one or more authentication mechanisms configured within the authentication scheme 308.

The monitoring component 312 may be configured to create a user access model 314 based upon authentication scheme enforcement. The monitoring component 312 may update the user access model 314 based upon patterns of resource usage. For example, how often the user 302 accesses the resource 310 (e.g., how often the user 302 accesses their email), the type of activity performed through the resource (e.g., how many emails are sent through an email account), the level of security provided by the authentication scheme, etc. The monitoring component 312 may present a suggested authentication scheme configuration 316 to the user 302 based upon comparing the user access model 314 with a recommended usage (e.g., recommended level of security based upon characteristics of the resource 310, how often the resource 310 is used, etc.).

Figure 4:
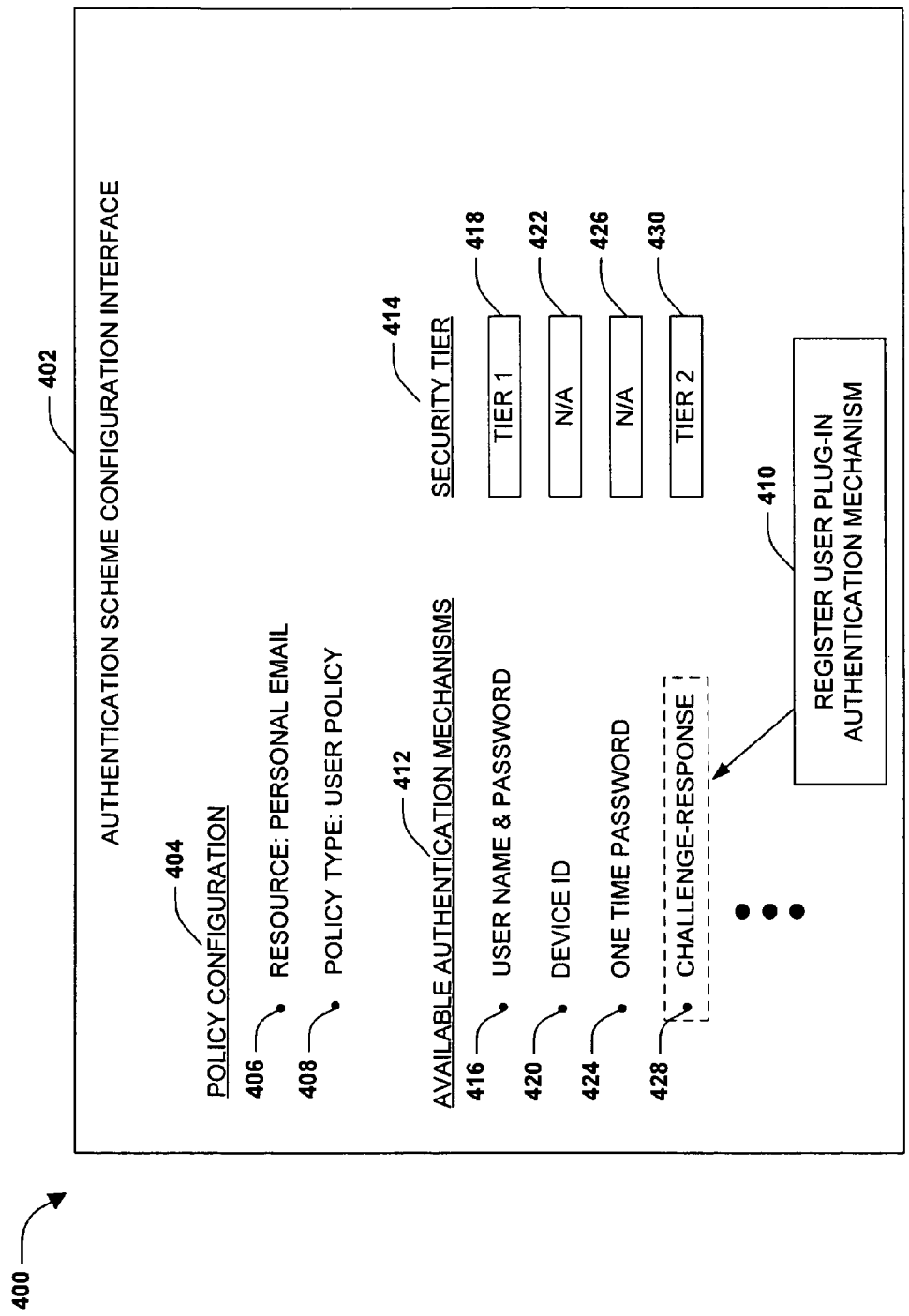
FIG. 4 is an illustration of an example of an authentication scheme configuration interface.

FIG. 4 illustrates an example 400 of an authentication scheme configuration interface. An authentication scheme configuration interface 402 comprising a set of available authentication mechanism 412 and one or more configurable policies 404 may be presented. The set of available authentication mechanisms 412 may comprise predefined authentication mechanisms (e.g., a user name and password 416, a device ID 420, a one time password 424) and/or user plug-in authentication mechanisms (e.g., a challenge-response 428). The authentication scheme configuration interface 402 may comprise a security tier 414 that may allow a user to designate a particular security tier to an available authentication mechanism.

The authentication scheme configuration interface 402 may provide a user the ability to configure an authentication scheme. For example, a user may select one or more authentication mechanisms to create an authentication mechanism list and select one or more polices within the authentication scheme configuration interface 402.

The authentication scheme configuration interface 402 may also allow the user to register user plug-in authentication mechanisms (e.g., a register user plug-in authentication mechanism button 410). For example, a user may invoke the register user plug-in authentication mechanism button 410 to register the challenge-response 428 (e.g., a user plug-in authentication mechanism) with the authentication scheme configuration interface 402. Once registered, the challenge-response 428 may be available to select for configuring the authentication scheme.

In one example, within the one or more configurable policies 404, a user policy 408 associated with a personal email resource 406 may be specified, for example, by a user. That is, the authentication scheme that is to be configured based upon the user policy 408 may be associated with the personal email resource 406, such that the authentication scheme may be enforced upon authentication requests to access the personal email resource 406. Within the available authentication mechanism 412, the user name and password 416 has been specified as a tier (1) 418 security tier and the challenge-response 428 has been specified as a tier (2) 430 security tier. It may be appreciated that one or more available authentication mechanisms may not be selected for configuration within the authentication scheme; therefore the security tier 414 may comprise a N/A (e.g., N/A 422 and N/A 426) designating that a security tier is not applicable to the particular available authentication mechanism.

The user policy 408 and an authentication mechanism list comprising one or more selected available authentication mechanisms may be received. The one or more selected available authentication mechanisms may comprise corresponding security tiers. The authentication scheme may be configured based upon the user policy 408 and the authentication mechanism list.

Figure 5:
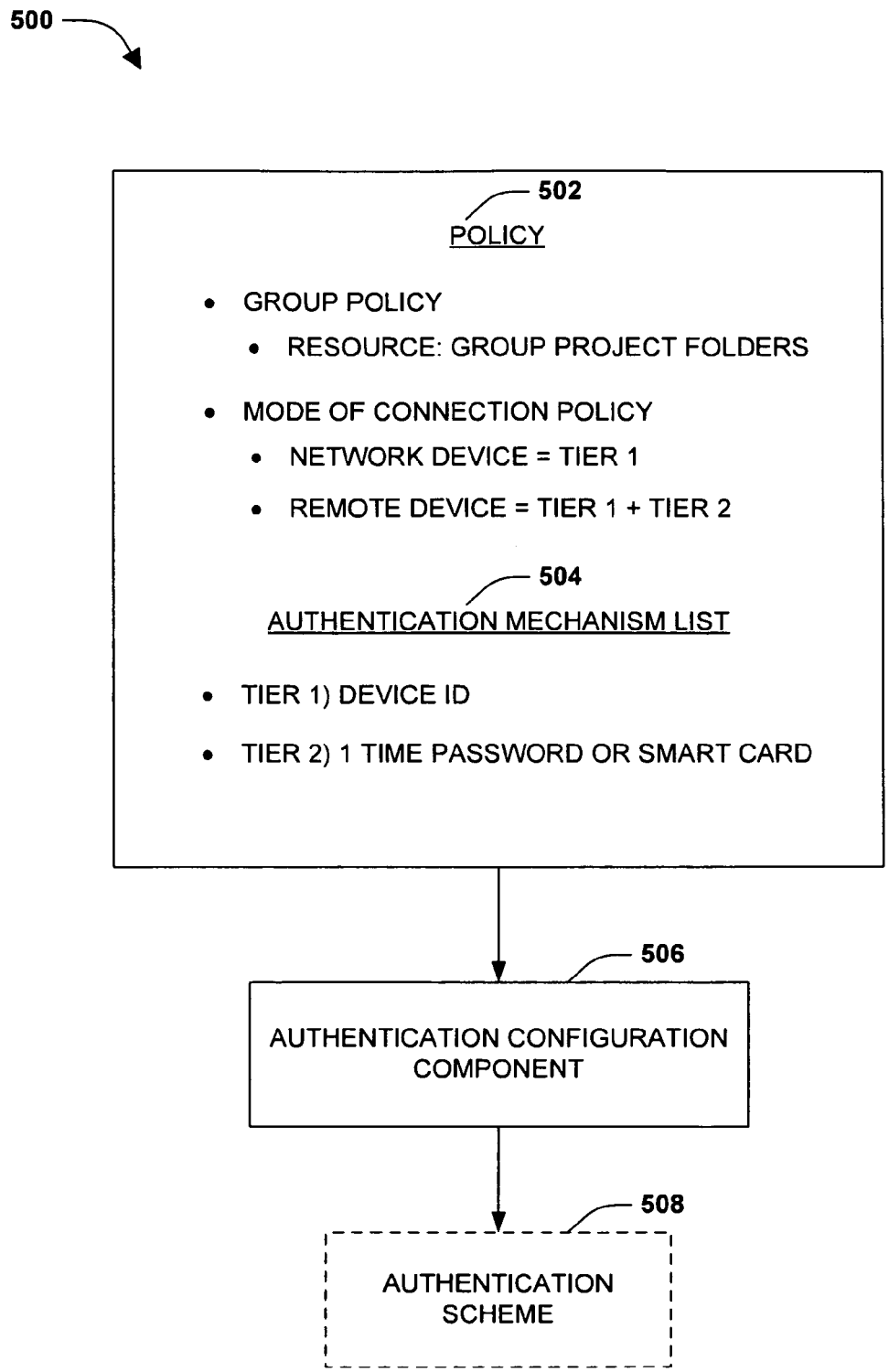
FIG. 5 is an illustration of an example of configuring a model based authentication scheme.

FIG. 5 illustrates an example 500 of configuring a model based authentication scheme. A policy 502 and an authentication mechanism list 504 may be received by an authentication configuration component 506. It may be appreciated that, in one example, the authentication configuration component 506 may be implemented through a variety of techniques, such as a user interface (e.g., an authentication scheme configuration interface, such as that 402 illustrated in FIG. 4), wherein the policy 502 and the authentication mechanism list 504 may be received in response to user input within the user interface. Within the policy 502, a group policy and a mode of connection policy may be specified. The group policy may be associated with a group project folders resource. The mode of connection policy may specify that users authenticating through a local network device (e.g., a work computer) authenticate using tier (1) security tier and users authenticating through a remote device (e.g., a public computer) authenticate using tier (1) and tier (2) security tiers.

The authentication mechanism list 504 may specify one or more authentication mechanisms to associate with an authentication scheme 508. For example, a device ID may be designated as tier (1) security tier and a one time password and/or smart card may be designated as tier (2) security tier (e.g., a user may authenticate using either the one time password or the smart card). The authentication configuration component 506 may configure an authentication scheme 508 based upon the policy 502 and the authentication mechanism list 504. For example, the authentication mechanisms within the authentication mechanism list 504 may be invoked to authenticate a user (e.g., a user belonging to a group associated with the group policy) attempting to access the group project folders resource. The authentication scheme 508, for example, may be implemented through an online identity provider.

Figure 6:
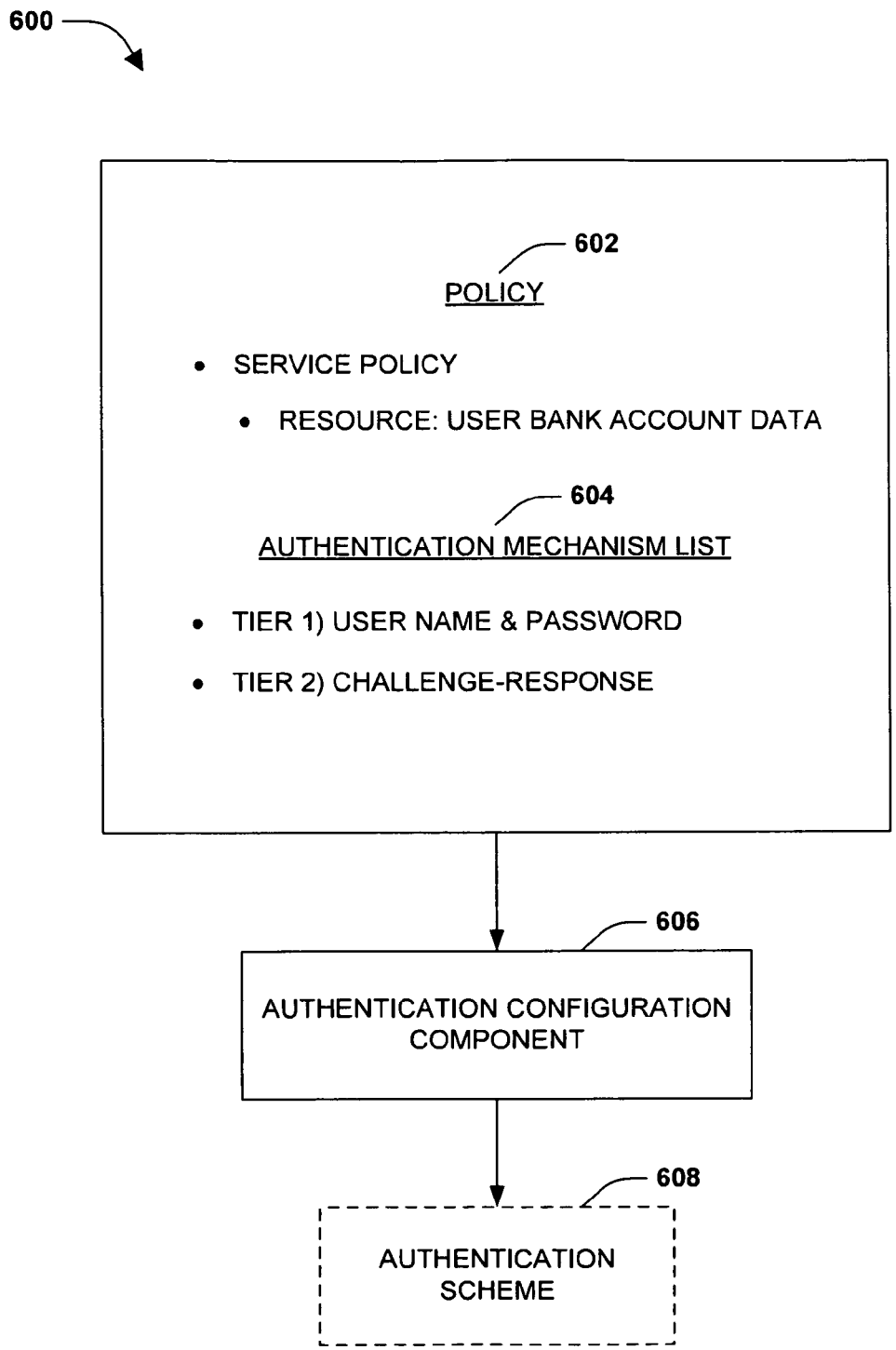
FIG. 6 is an illustration of an example of configuring a model based authentication scheme.

FIG. 6 illustrates an example 600 of configuring a model based authentication scheme. A policy 602 and an authentication mechanism list 604 may be received by an authentication configuration component 606. Within the policy 602, a service policy may be specified. The service policy may be associated with a user bank account data resource. In one example, the service policy may be configured by a bank, wherein the service policy specifies how bank clients authenticate to access bank resources. The authentication mechanism list 604 may specify one or more authentication mechanisms to associate with an authentication scheme 608. For example, a user name and password may be designated as tier (1) security tier and a challenge-response may be designated as tier (2) security tier.

The authentication configuration component 606 may configure the authentication scheme 608 based upon the policy 602 and the authentication mechanism list 604. For example, the authentication mechanisms specified within the authentication mechanism list 604 may be invoked to authenticate a user (e.g., a bank user) attempting to access the user bank account data resource. The authentication scheme 608, for example, may be implemented through an online identity provider.

Figure 7:
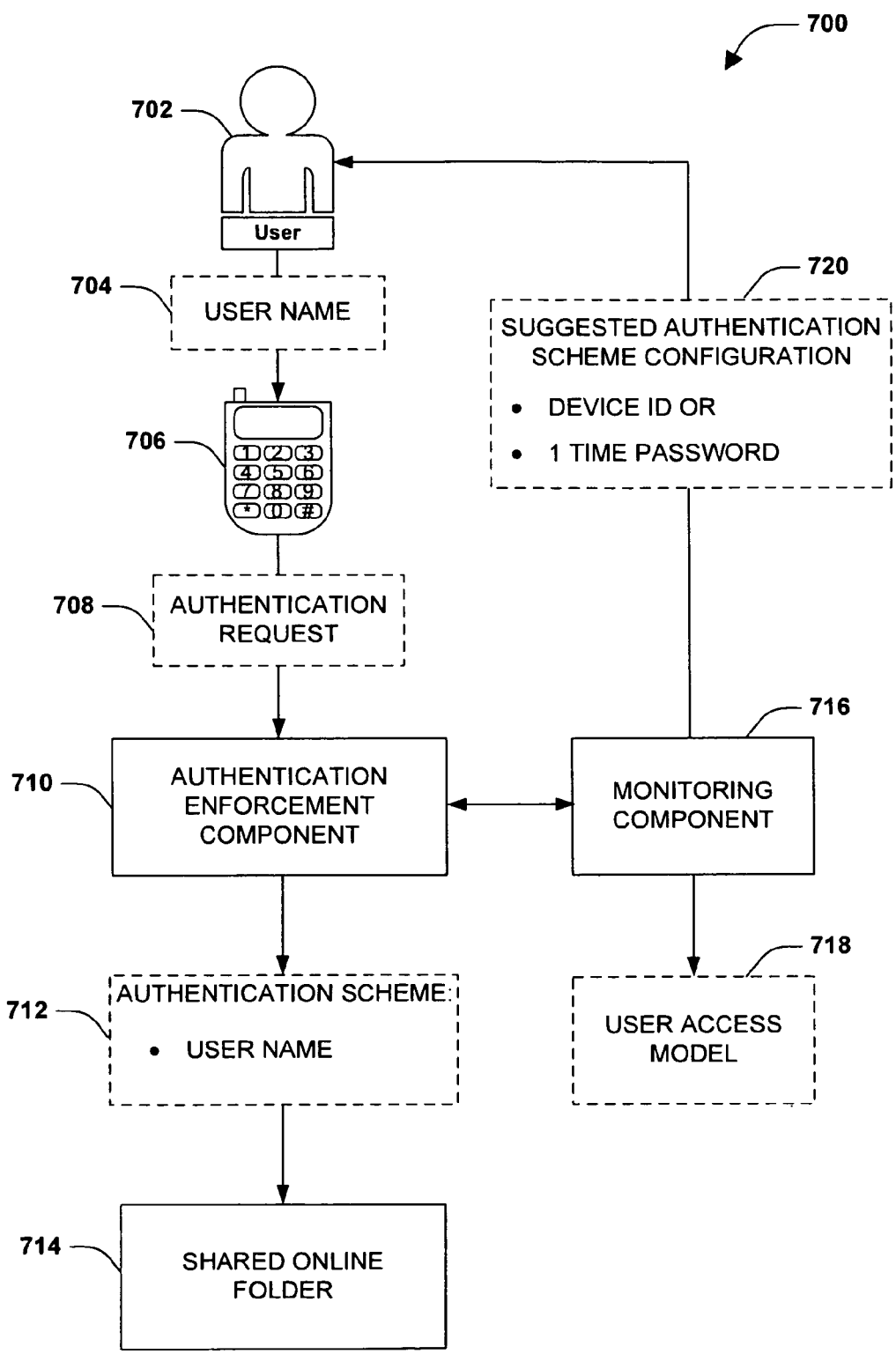
FIG. 7 is an illustration of an example of enforcing an authentication scheme and presenting a suggested authentication scheme configuration.

FIG. 7 illustrates an example 700 of enforcing an authentication scheme and presenting a suggested authentication scheme configuration. A user 702 may attempt to authenticate (e.g., send an authentication request 708 to authenticate for access to a shared online folder 714) through a cell phone 706 by supplying a user name 704. An authentication enforcement component 710 may receive the authentication request 708. The authentication enforcement component 710 may enforce an authentication scheme 712 associated with the shared online folder 714. For example, the authentication scheme 712 may be configured with a user name authentication mechanism (e.g., a tier (1) security tier) that is executed upon the user name 704 to authenticate the user 702 for access to the shared online folder 714.

A monitoring component 716 may be configured to create a user access model 718 based upon the enforcement of the authentication scheme 712. For example, the user access model 718 may comprise information about the user name authentication mechanism, characteristics of the shared online folder 714, patterns of usage for the shared online folder 714, etc. The monitoring component 716 may update the user access model 718 based upon patterns of resource usage (e.g., how often the user accesses the shared online folder 714, what activities are performed in connection with the shared online folder 714, etc.). The monitoring component 716 may compare the user access model 718 with a recommended usage (e.g., typical security for an online shared folder, security based upon frequency of access and usage of the online shared folder, etc.) to create a suggested authentication scheme configuration 720. For example, the monitoring component 716 may determine that a high security level, such as a device ID or one time password is recommended for shared online folders. The monitoring component 716 may present the suggested authentication scheme configuration 720 suggesting that the user 702 reconfigured the authentication scheme 712 to an increased security configuration, such as a device ID and/or a one time password.

Figure 8:
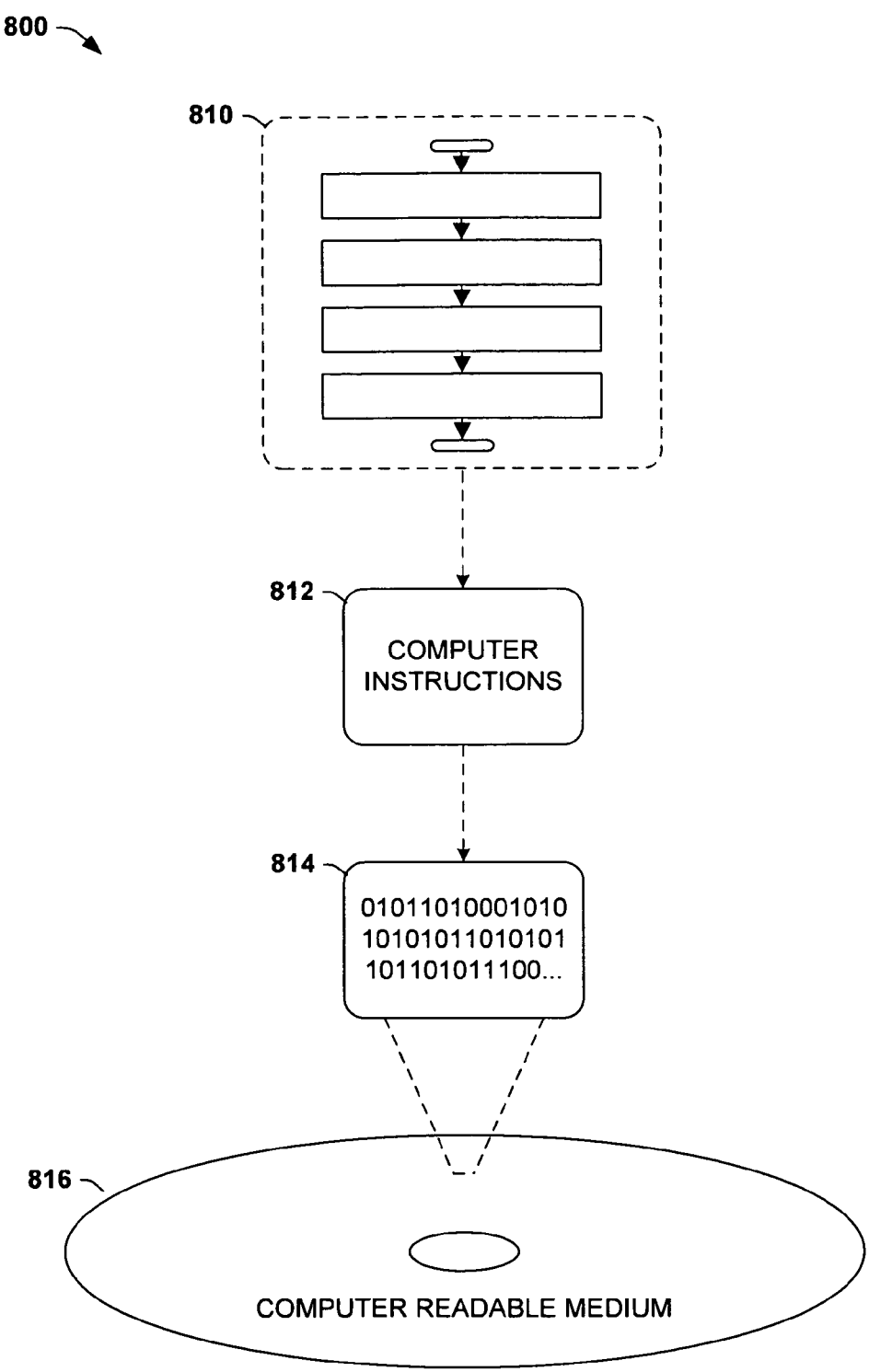
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable instructions 812 may be configured to perform a method 810, such as the exemplary method 100 of FIG. 1, for example. In another such embodiment, the processor-executable instructions 812 may be configured to implement a system, such as the exemplary system 200 of FIG. 2 and the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
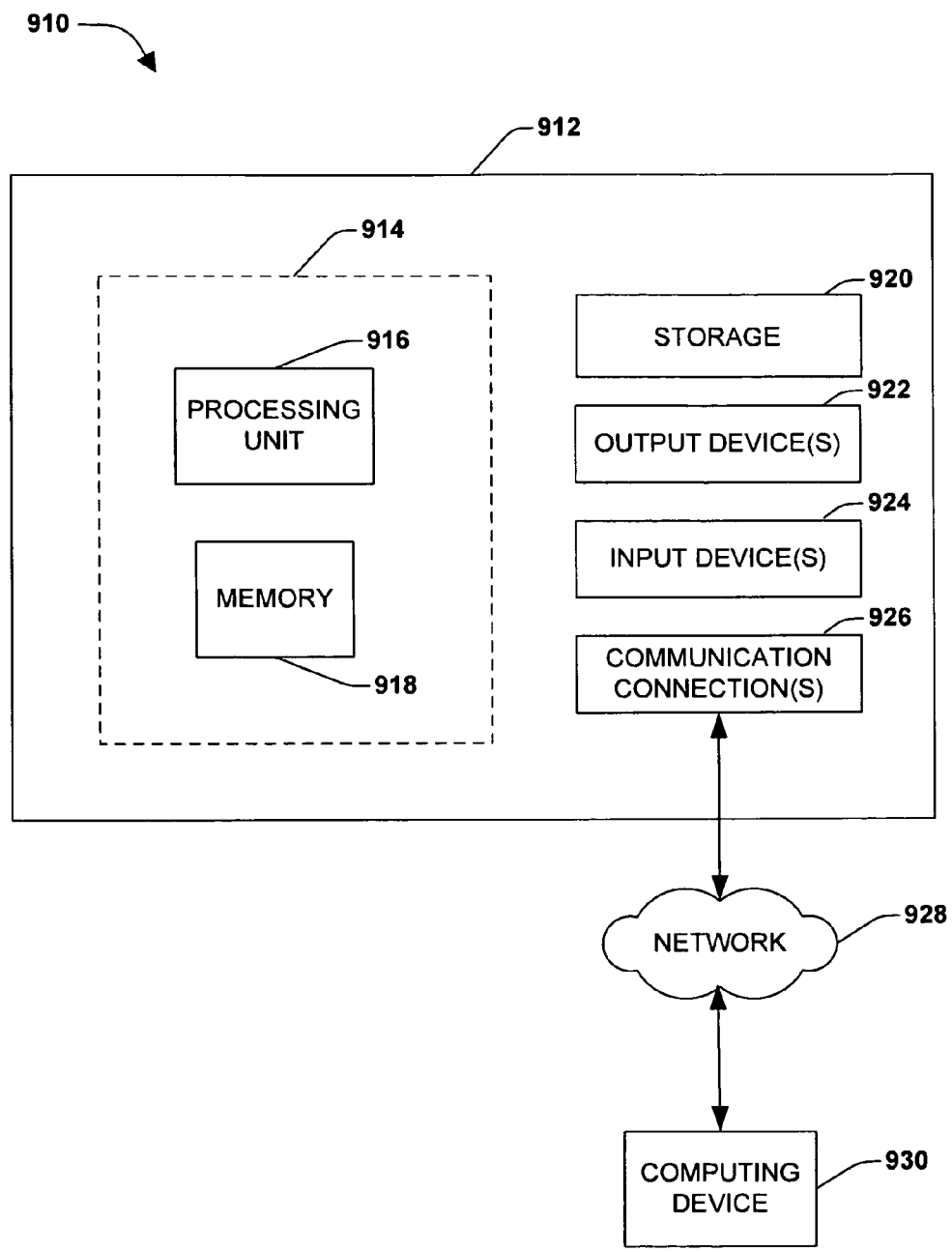
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at a computer system that includes one or more processors, for configuring an authentication scheme for a client device, the method comprising:
   receiving an authentication request from a client device, the authentication request requesting access by a user to a resource;
   accessing an authentication mechanism list comprising a plurality of authentication mechanisms that are available for authenticating the user for access to the resource;
   accessing a user access model that models a pattern of usage of the resource by the user;
   accessing a mode of connection policy defining access to one or more resources via one or more modes;
   based at least on accessing the authentication mechanism list, the user access model, and the mode of connection policy, configuring an authentication scheme that includes one or more of the plurality of authentication mechanisms that are configured for authenticating the user to access the resource, the configuring including updating the authentication scheme to include the one or more authentication mechanisms that are configured for authenticating the user to access the resource, based on the pattern of usage of the resource by the user;
   sending a response to the client device, the response recommending the updated authentication scheme to the user; and
   enabling access to the resource based on the recommended updated authentication scheme.

2. The method of claim 1, the configuring including updating the authentication scheme based at least in part on a user policy defining access to one or more user resources.

3. The method of claim 1, the configuring including updating the authentication scheme based at least in part on a group policy defining access to one or more group resources.

4. The method of claim 1, wherein the mode of connection policy defines first access via a first mode corresponding to one or more first types of devices and defines second access via a second mode corresponding to one or more second types of devices.

5. The method of claim 1, the configuring including updating the authentication scheme based at least in part on a service policy defining access to one or more resources associated with a service.

6. The method of claim 1, further comprising presenting a user plug-in authentication mechanism to the client device that enables the client device to expand the authentication mechanism list to comprise additional authentication mechanisms.

7. The method of claim 1, further comprising enforcing the updated authentication scheme based at least in part on an authentication request.

8. The method of claim 1, further comprising updating the user access model based at least in part on the updated authentication scheme.

9. The method of claim 8, further comprising updating the user access model based at least in part on a pattern of resource usage.

10. A system for configuring an authentication scheme, the system comprising:
one or more processing units; and
memory comprising instructions that when executed by at least some of the one or more processing units, cause the system to perform at least the following:
receive an authentication request from a client device, the authentication request requesting access by a user to a resource;
access an authentication mechanism list comprising a plurality of authentication mechanisms that are available for authenticating the user for access to the resource;
access a user access model that models a pattern of usage of the resource by the user;
access a mode of connection policy defining access to one or more resources via one or more modes;
based at least on accessing the authentication mechanism list, the user access model, and the mode of connection policy, configure an authentication scheme that includes one or more of the plurality of authentication mechanisms that are configured for authenticating the user to access the resource, the configuring including updating the authentication scheme to include the one or more authentication mechanisms that are configured for authenticating the user to access the resource, based on the pattern of usage of the resource by the user;
send a response to the client device, the response recommending the updated authentication scheme to the user; and
enable access to the resource based on the recommended updated authentication scheme.

11. The system of claim 10, the configuring including updating the authentication scheme based at least in part on a user policy defining access to one or more user resources.

12. The system of claim 10, the configuring including updating the authentication scheme based at least in part on a group policy defining access to one or more group resources.

13. The system of claim 10, the configuring including updating the authentication scheme based at least in part on a service policy defining access to one or more resources associated with a service.

14. The system of claim 10, the mode of connection policy defining first access via a first mode corresponding to one or more first types of devices and defining second access via a second mode corresponding to one or more second types of devices.

15. The system of claim 10, further comprising instructions that when executed by at least some of the one or more processing units, cause the system to present a user plug-in authentication mechanism to the client device that enables the client device to expand the authentication mechanism list to comprise additional authentication mechanisms.

16. A computer-readable hardware storage device comprising computer-executable instructions, which when executed at least in part via a processing unit on a computer, causes the computer to perform at least the following:
receive an authentication request from a client device, the authentication request requesting access by a user to a resource;
access an authentication mechanism list comprising a plurality of authentication mechanisms are available for authenticating the user for access to the resource;
access a user access model that models a pattern of usage of the resource by the user;
access a mode of connection policy defining access to one or more resources via one or more modes;
based at least on accessing the authentication mechanism list, the user access model, and the mode of connection policy, configure an authentication scheme that includes one or more of the plurality of authentication mechanisms that are configured for authenticating the user to access the resource, the configuring including updating the authentication scheme to include the one or more authentication mechanisms that are configured for authenticating the user to access the resource, based on the pattern of usage of the resource by the user;
send a response to the client device, the response recommending the updated authentication scheme to the user; and
enable access to the resource based on the recommended updated authentication scheme.

17. The computer-readable hardware storage device of claim 16, the configuring including updating the authentication scheme based at least in part on a user policy defining access to one or more user resources.

18. The computer-readable hardware storage device of claim 16, the configuring including updating the authentication scheme based at least in part on a group policy defining access to one or more group resources.

19. The computer-readable hardware storage device of claim 16, the configuring including updating the authentication scheme based at least in part on a service policy defining access to one or more resources associated with a service.

* * * * *